(12) United States Patent
Fussner et al.

(10) Patent No.: US 8,408,116 B2
(45) Date of Patent: Apr. 2, 2013

(54) METHOD OF FITTING A PISTON FOR USE IN AN INTERNAL COMBUSTION ENGINE

(75) Inventors: David W. Fussner, Twinsburg, OH (US); Mark E. Chollett, Concord Township, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1034 days.

(21) Appl. No.: 12/416,233

(22) Filed: Apr. 1, 2009

(65) Prior Publication Data

US 2010/0251886 A1    Oct. 7, 2010

(51) Int. Cl.
*F16J 1/04* (2006.01)
*F01B 31/10* (2006.01)

(52) U.S. Cl. .......... 92/223; 92/155; 92/212; 29/888.048

(58) Field of Classification Search .................... 92/153, 92/155, 212, 223, 248; 29/888.048
See application file for complete search history.

(56) References Cited

U.S. PATENT DOCUMENTS

| | | | |
|---|---|---|---|
| 2,817,562 A | 12/1957 | Fleming et al. |
| 3,528,667 A | 9/1970 | Spaven |
| 3,550,988 A | 12/1970 | Schenck, Jr. |
| 3,930,472 A | 1/1976 | Athenstaedt |
| 3,995,538 A | 12/1976 | Beardmore et al. |
| 4,050,360 A | 9/1977 | Powers et al. |
| 4,178,899 A | 12/1979 | Julich |
| 4,440,069 A | 4/1984 | Holtzberg et al. |
| 4,677,900 A | 7/1987 | Philby |
| 4,831,977 A | 5/1989 | Presswood |
| 4,868,067 A | 9/1989 | Fujisawa et al. |
| 4,987,865 A | 1/1991 | Schenkel |
| 5,052,281 A | 10/1991 | Kawabata et al. |
| 5,063,894 A | 11/1991 | Mielke et al. |
| 5,195,478 A | 3/1993 | Kawabata et al. |
| 5,313,919 A | 5/1994 | Rao et al. |
| 5,435,872 A | 7/1995 | Penrice |
| 5,469,777 A | 11/1995 | Rao et al. |
| 5,884,600 A | 3/1999 | Wang et al. |
| 6,189,548 B1 | 2/2001 | Witt et al. |
| 6,303,232 B1 | 10/2001 | Mihoya et al. |
| 6,495,267 B1 | 12/2002 | Schenkel |
| 6,682,778 B1 | 1/2004 | Os |
| 6,817,333 B2 | 11/2004 | Wang et al. |
| 6,863,922 B2 | 3/2005 | Ogihara et al. |
| 7,051,645 B2 | 5/2006 | Schenkel et al. |
| 7,134,382 B2 | 11/2006 | Murase et al. |
| 7,171,936 B2 | 2/2007 | Rein et al. |

OTHER PUBLICATIONS

"Molykote(R) D-10 Anti-Friction Coating Piston Coating Process Recommendations," Version 1.9, 5 pages, by Dow Corning Corporation (Jan. 22, 1998).
"Information About Molykote® D 10 Anti-Friction Coating," 2 pages, by Dow Corning Corporation (1996).
"Material Safety Data Sheet—Molykote(R) D 10 Anti-Friction Coating," 8 pages, by Dow Corning Corporation (Jun. 21, 2005).
"Chrysler Corporation Coated Piston Production: 0 to 9,000 Per Day in Seventeen Days," 3 pages (Dec. 21, 2006).

(Continued)

*Primary Examiner* — Michael Leslie
(74) *Attorney, Agent, or Firm* — Thompson Hine L.L.P.

(57) ABSTRACT

A piston assembly including a piston body having a crown and a skirt, the skirt including at least a major thrust face and a minor thrust face, wherein the piston body defines a bore between the major thrust face and the minor thrust face, and a wear coating applied to the major thrust face and the minor thrust face, the wear coating having a cured thickness of at least about 30 microns.

19 Claims, 4 Drawing Sheets

OTHER PUBLICATIONS

Yagi, T. et al. "SAE Technical Paper Series. Experimental Method of Determining Piston Profile by Use of Composite Materials," 9 pages, presented at the SAE Car Meeting, Troy, Michigan (Jun. 7-10, 1982).

Ye, Z. et al., "An experimental investigation of piston skirt scuffing: a piston scuffing apparatus, experiments, and scuffing mechanism analyses," *Wear*, 257, pp. 8-31 (2004).

"Molykote® Anti-Friction Coatings Selection Guide," 31 pages, by Dow Corning Corporation (2003).

| WISECO Performance Products | WISECO Performance Products |
|---|---|
| WISECO Pro-Lite Piston Assembly | WISECO Pro-Lite Piston Assembly |
| 647M054 | 647M054 |
| for Yamaha YZ125 54 mm bore | for Yamaha YZ125 54 mm "A"-"D" bores |
| (300) | (320) |

FIG. 5

METHOD OF FITTING A PISTON FOR USE IN AN INTERNAL COMBUSTION ENGINE

TECHNICAL FIELD

The present disclosure relates to internal combustion engines and, more particularly, to a method of fitting a piston into the cylinder of an internal combustion engine, the method including the application of a organoresin containing entrained solid lubricants onto a piston skirt.

BACKGROUND

Internal combustion engines generally include an engine block housing one or more cylinders and a corresponding number of pistons which seal against the cylinder sidewalls during operation in order to extract power from the combustion cycle. The cylinders are typically cast as rough bores, and may subsequently be machined to produce a cylinder with a desired internal diameter or, alternately, lined with a cylinder sleeve having the desired internal diameter during the manufacture of the block. In either approach it is difficult to obtain a precise internal diameter for the cylinders, as the tools used to size and finish the cylinders or cylinder sleeves have positioning tolerances and are subject to wear over time. Consequently, the cylinders within a single engine block, as well as the cylinders within nominally identical engine blocks manufactured over time, tend to have actual internal diameters which vary from a nominal diameter within an accepted tolerance. For example, in an engine with 54 mm (2.1260 inch) cylinders, the tolerance for the internal diameter may be +0.014/−0.000 mm (+0.0005/−0.000 inch), and the individual cylinders may have actual internal diameters of 54.000-54.014 mm (2.1260 to 2.1265 inches).

The pistons, which must essentially conform to the internal diameter of the cylinders during operation, also tend to have actual diameters which vary from a nominal diameter within an accepted tolerance. For example, on modern manufacturing equipment pistons for 54 mm cylinders may be turned with a tolerance for the external diameter of +0.000/−0.014 mm (+0.0000/−0.0005 inch). However in high performance or low emission engines the tolerance for the proper piston-to-cylinder wall clearance, typically measured at a predetermined location along the piston skirt, may be substantially less than the manufacturing tolerances for the cylinder and piston components, e.g., ±0.0035 mm (±0.00014 inch), or about one fourth of the individual tolerances described above. Under these constraints, manufacturing a single piston part sized for a cylinder having the nominal internal diameter would be undesirable, since a piston that is undersized with respect to the cylinder will contribute to a reduction in peak compression and efficiency, as well as an increase in combustion gas blow-by, oil deterioration, and operating noise. On the other hand, manufacturing a single piston for an engine cylinder having a 'typical' internal diameter, e.g., a cylinder having the mean or median internal diameter of that permitted by the manufacturing tolerance, would be undesirable since a piston that is oversized with respect to a cylinder will contribute to an increased risk of piston seizure, as well as an increase in frictional losses, piston wear, and cylinder wear.

Current practice seeks to satisfy piston-to-cylinder wall clearance tolerances by matching individual cylinders with individual pistons. Each cylinder in an engine block is measured in a controlled environment and graded with a designation that indicates the degree of variation from the nominal cylinder diameter, e.g., following the above-described example, with a letter "A" to designate a cylinder with an actual internal diameter of 54.000-54.002 mm, a letter "D" to designate a cylinder with an actual internal diameter of 54.012-54.014 mm, and intermediate letters to designate intermediate internal diameters. The grade designations are typically marked, stamped, or otherwise provided on the engine near each cylinder so that an appropriately sized piston can be fitted into the cylinder during the manufacturing of the engine and any subsequent repairs. At the same time, original and aftermarket parts manufacturers will manufacture, measure, and grade a line of pistons having a range of actual diameters appropriate for the range of potential cylinder diameters, e.g., following the above-described example, a 54 mm "A" piston having an external diameter of 53.957-53.960 mm (2.1243 to 2.1244 inches), a 54 mm "D" piston having an external diameter of 53.969-53.972 mm (2.1248-2.1249 inches), etc., so that by matching the marked grades assembly workers can draw from stocks of appropriately sized pistons and end users can order appropriately sized piston kits. However this practice requires manufacturers and their distributors to maintain complex inventories of pistons for not only all of the models of engines within their target markets, but also for all of the grades of cylinder sizes established for each model of engine. Thus the practice of grading cylinders and pistons leads to increased administrative and capital expenses due to larger inventories, as well as a heightened potential for shortages of particular pistons due to the specialized nature of the inventory.

Therefore there is a need for a method of fitting a piston into the cylinder of an internal combustion engine that can overcome the limitations which have lead to the use of grading for achieving proper piston-to-cylinder wall clearances, and reduce or even eliminate the need to manufacture, measure, and inventory a well populated range of piston grades for the assembly and servicing of a particular model of engine.

SUMMARY

A piston assembly including a piston body having a crown and a skirt, the skirt including at least a major thrust face and a minor thrust face, wherein the piston body defines a bore between the major thrust face and the minor thrust face, and a wear coating applied to the major thrust face and the minor thrust face, the wear coating having a cured thickness of at least about 30 microns.

Also, a method for fitting a piston having a skirt into a corresponding cylinder having a cylinder diameter, the method including the steps of applying a wear coating to at least a portion of the skirt, curing the wear coating, the cured wear coating having a thickness of at least about 30 microns such that the piston has a coated skirt diameter, wherein the coated skirt diameter is greater than the cylinder diameter, and, after the curing step, fitting the piston into the corresponding cylinder to shear at least a portion of the cured wear coating from the skirt.

Also, a method of fitting a piston into the cylinder of an internal combustion engine, including the steps of: obtaining a piston sized for an engine cylinder in a predetermined model of engine; applying a wear coating to the exterior of the piston skirt so that the cured coating will have a thickness of between 30 and 50 microns over the skirt; fitting the coated piston into a cylinder in the predetermined model of engine, shearing any excess wear coating off of the piston skirt; and running the piston within the cylinder of the predetermined model of engine. The obtained piston is preferably sized for proper fitting into a cylinder having an internal diameter equal to a predetermined minimum diameter for the cylinder of the predetermined model of engine.

Also, a method of manufacturing a piston for a cylinder in an internal combustion engine, including the steps of: obtaining a piston sized for an engine cylinder in a predetermined model of engine; applying a wear coating to the exterior of the piston skirt so that the cured coating will have a thickness of between 30 and 50 microns over the skirt; and marking the piston or any associated packaging materials with an intended cylinder diameter which is equal to the nominal diameter of cylinders in the predetermined model of engine, as opposed to a graded diameter of the cylinder. The obtained piston is preferably sized for proper fitting into a engine cylinder having an internal diameter equal to a predetermined minimum diameter for cylinders in the predetermined model of engine.

Also, a method of manufacturing a piston for a cylinder in an internal combustion engine, including the steps of: obtaining a piston sized for an engine cylinder in a predetermined model of engine; applying a wear coating to the exterior of the piston skirt so that the cured coating will have a thickness of between 30 and 50 microns over the skirt; and marking the piston or any associated packaging materials with an intended cylinder diameter which includes multiple grade indications applicable to cylinders in the predetermined model of engine. The obtained piston is preferably sized for proper fitting into a cylinder having an internal diameter equal to the minimum diameter of the cylinders indicated by the marked grade indications.

BRIEF DESCRIPTION OF THE DRAWINGS

FIG. 5 is an exemplary view of packaging marked according to aspects of the described methods.

DETAILED DESCRIPTION

Figure 1:
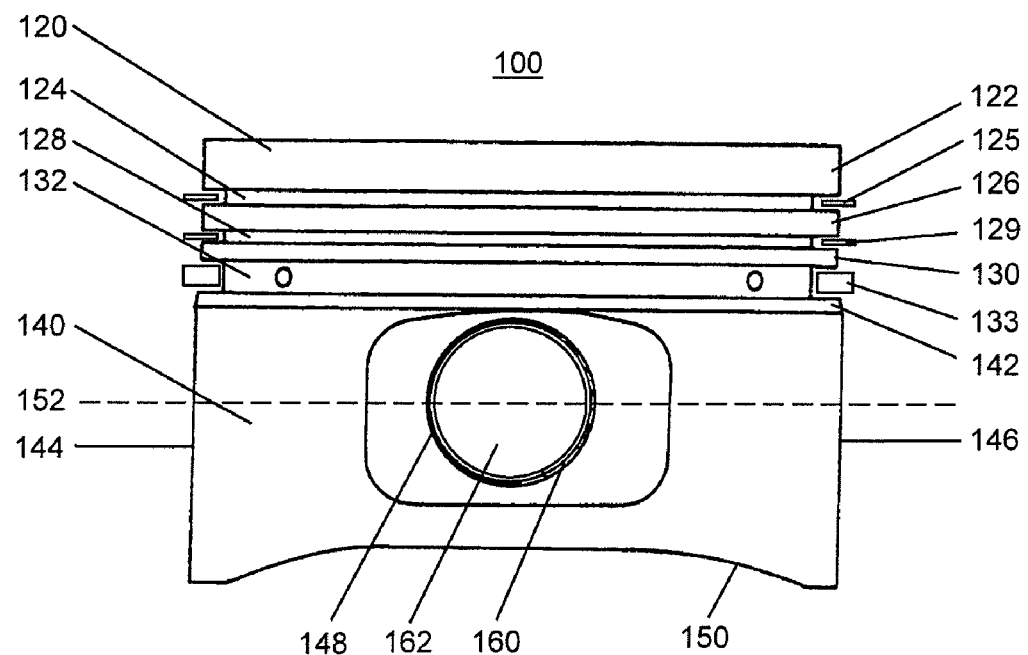
FIG. 1 is a side view of a piston for an internal combustion engine.
Figure 2:
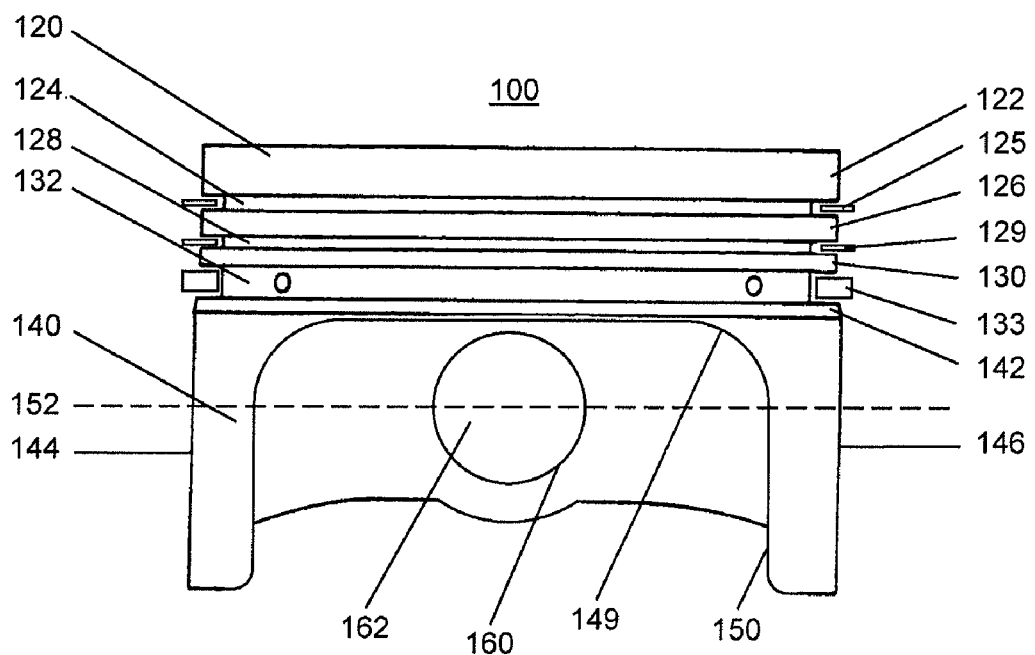
FIG. 2 is a side view of an alternate piston for an internal combustion engine.

In FIGS. 1 and 2, a piston 100 for an internal combustion engine is shown, the piston including a crown 120, a depending skirt 140, and a pin boss 160. The crown 120 of the piston typically includes a land 122 and at least one groove 124 which receives a top compression ring 125. The crown 120 may also include additional lands 126, 130 and additional grooves 128, 132 which receive a second compression ring 129 and an oil control ring 133. The lands 122, 126, 130 are typically recessed with respect to the shoulder 142 of the skirt 140, with the top ring 125 and any additional rings 129, 133 serving to substantially seal the crown 120 against the cylinder walls during a combustion stroke. The land-to-cylinder clearance is typically greater than the skirt-to-cylinder clearance, described below, and may be about 0.005 to 0.01 times the nominal cylinder diameter in order to provide for thermal expansion of the crown 120 during operation of the engine. In some pistons, the additional lands 126, 130 may have lesser clearances, with the series of lands tapering outward toward the shoulder 142 of the skirt 140 to account for the thermal profile of the crown 120. Those having skill in the art will recognize that the pistons usable with the disclosed method may have only a top ring retained within a single groove, or a plurality of rings retained within multiple grooves, or other structures acting to seal a crown 120 against a cylinder sidewall, as variously used in known piston designs.

The skirt 140 of the piston typically includes a shoulder 142, a major thrust face 144, a minor thrust face 146, and a pair of apertures 148 which allow for a pin to be inserted through the pin boss 160. As shown in FIG. 2, in some high performance designs the terminal end 150 of the skirt 140 may be axially profiled so that there is a substantial skirt portion at both the major thrust face 144 and the minor thrust face 146, but only a minor shoulder portion 142 elsewhere so as to reduce the reciprocating mass of the piston. Such minor shoulder portions may define notches 149 in the terminal end 150 that allow for a pin to be inserted through the pin boss 160 in place of the apertures 148 described above. The skirt 140 frequently has a compound shape, most often including a half-barrel-like or full-barrel-like outer surface profile, in order to account for thermal expansion due to heat flow from the crown 120 and to optimize piston and oil dynamics. Due to the compound shape, there will frequently be a manufacturer-specified axis 152 for measuring the skirt diameter and thus determining the piston diameter and piston-to-cylinder wall clearance. This axis will typically pass through the piston 100 at the level of the pin boss 160 and extend perpendicular to the axis of the pin bore 162. Those having skill in the art will recognize that particular piston designs may have other manufacturer-specified locations to be used for determining piston diameter and piston-to-cylinder clearance, and that such pistons may also be usable with the disclosed method.

Figure 3:
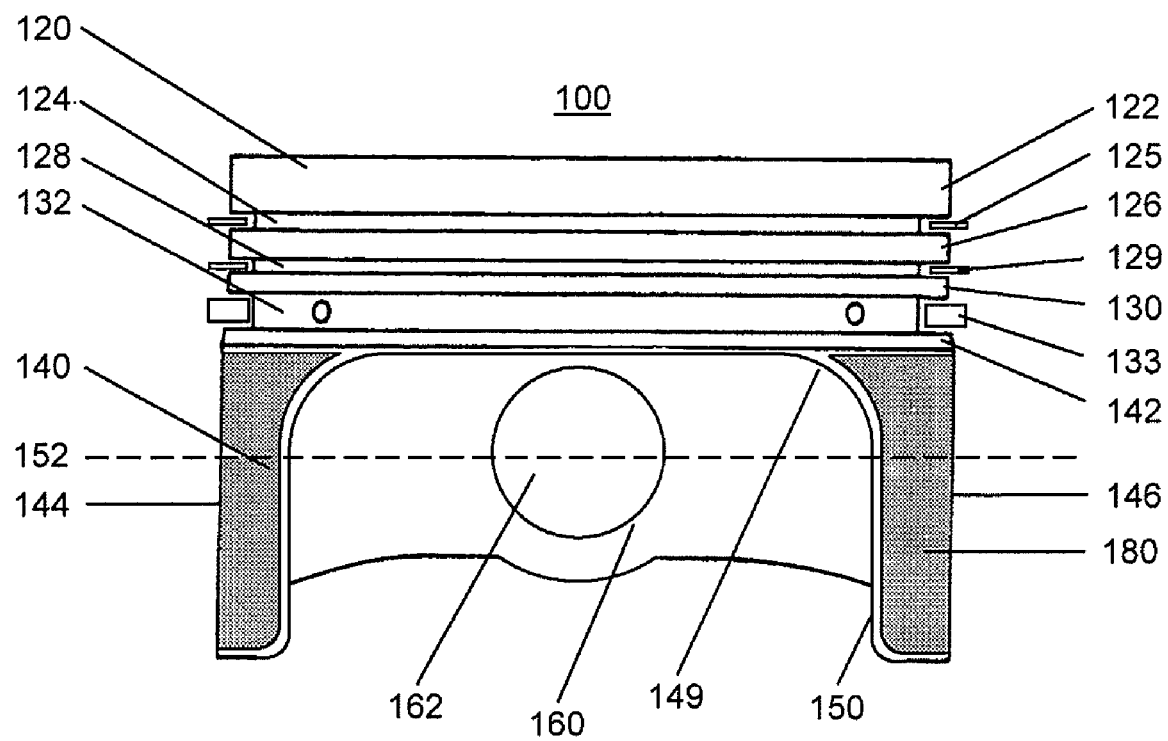
FIG. 3 is a side view of a piston coated according to an aspect of the described method.

As shown in FIG. 3, a piston 100 produced in accordance with the disclosed method is characterized in that a wear coating 180 is provided on at least the major thrust face 144 and the minor thrust face 146 of the piston 100. The wear coating 180, described in further detail below, is present at a thickness of about 30 microns (0.06 mm or 0.0012 inch increase in overall diameter) to about 50 microns (0.1 mm or 0.0039 inch increase in overall diameter) over the piston skirt 140 at the manufacturer-specified axis 152 or other manufacturer-specified points of measurement. Thus, the piston 100 may be sized for a cylinder having a predetermined minimum internal diameter, so as to ensure that a minimum piston-to-cylinder wall clearance, excluding the coating, is maintained, with the wear coating 180 acting as a moderately abradable material occupying a substantial portion of the gap between the piston skirt 140 and the cylinder wall, so as to ensure that a maximum piston-to-cylinder wall clearance, including the coating, is not exceeded. Consequently, the coated piston is effectively neither oversized with respect to the cylinder nor undersized with respect to the cylinder by virtue of the wear coating 180. The predetermined minimum internal diameter may be a nominal internal diameter, in instances where tolerances are specified to permit only a positive variation in diameter, or a minimum tolerated internal diameter, in instances where tolerances are specified to permit both positive and negative variation in diameter. However those having skill in the art will also recognize that the method may also be used to reduce, rather than eliminate, the use of grading to obtain ideal piston-to-cylinder wall clearance by reducing the number of piston grades required to provide proper fitting in some combinations of piston-to-cylinder wall clearance and piston-to-cylinder wall clearance tolerance.

Excess wear coating 180 can be expected to shear from the piston skirt 140 to the extent that its thickness exceeds that of the gap, and to wear from the piston skirt 140 to the extent that its thickness impairs the distribution of oil or other lubricants over the sidewalls of the engine cylinder. The composition of the wear coating 180, described in further detail below, acts to prevent undue wear to the piston and cylinder during break-in operation of the engine and the establishment of normal cylinder lubrication. Those having skill in the art will recognize that the term "moderately abradable" is used herein to describe a coating which may partially wear away in the absence of normal cylinder lubrication, but otherwise have sufficient durability to persist as an intact coating on a piston skirt 140 after extended engine operation (greater than 1,000-2,000 miles of vehicle operation after engine installation or repair).

Figure 4:
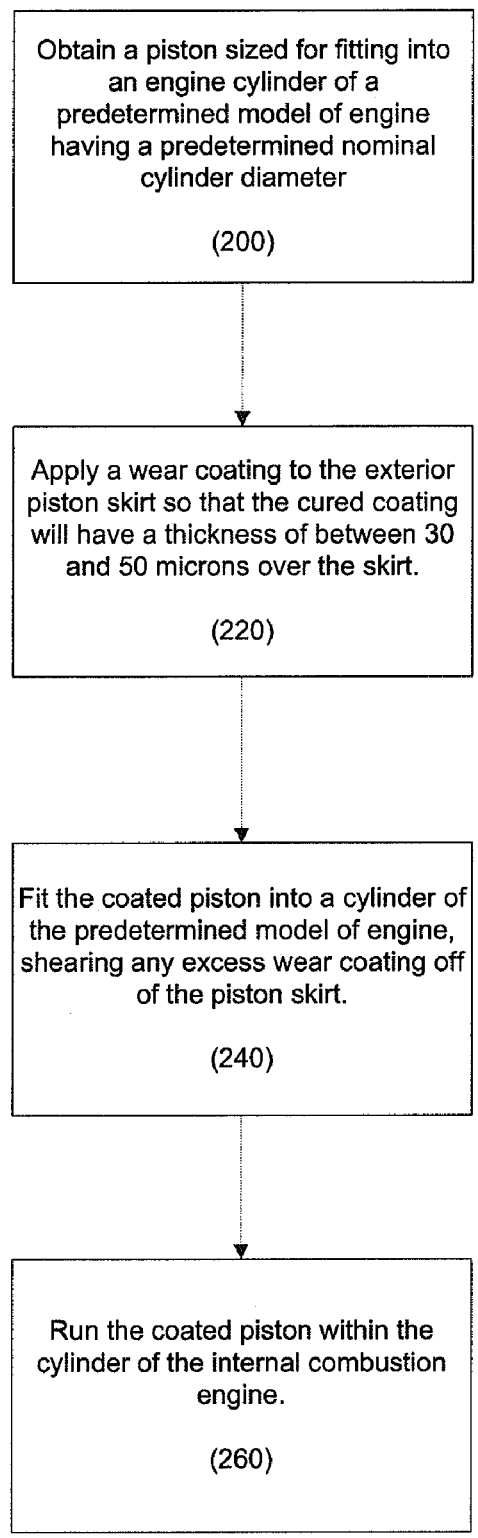
FIG. 4 is a flow chart generally illustrating an aspect of the described method.

As illustrated generally in FIG. 4, in a first step 200 of the disclosed method a supplier, such as an original equipment manufacturer, an aftermarket equipment manufacturer, or a value added manufacturer, obtains a piston 100 for use in an internal combustion engine. The piston 100 may be manufactured by the supplier itself or purchased from other manufacturers for resale. The piston 100 has a depending skirt 140, and is sized so that it may be fitted into an engine cylinder of a predetermined model of engine. Preferably the piston 100 is sized so that it may be properly fitted into a cylinder having an internal diameter equal to a predetermined minimum diameter for cylinders in the predetermined model of engine. In particular, the piston 100 may be sized such that the clearance or gap between the depending skirt 140 and the cylinder wall is from about 0.0015 to about 0.0005 times the predetermined minimum internal diameter. This clearance may be determined with reference to an axis passing through the piston 100 at the level of the pin boss 160 and extending perpendicular to the axis of the pin bore 162, or with reference to any superior manufacturer-specified points of measurement for determining piston diameter and piston-to-cylinder clearance.

In a second step 220 of the disclosed method, the supplier applies a wear coating 180 comprising a curable organoresin and an entrained solid phase lubricant to the exterior of the depending skirt 140. The coating is applied so that the cured organoresin will have a thickness of at least about 30 microns (0.03 mm or 0.0012 inches), preferably about 40 microns (0.04 mm or 0.0016 inches), and up to about 50 microns (0.05 mm or 0.0020 inches), over at least the major thrust face 144 and minor thrust face 146 of the depending skirt 140. The organoresin is preferably a thermosetting resin such as a polyamide, polyimide, polyamide-imide, or polyetheretherketone, and is preferably delivered as viscous liquid or paste through processes such as direct screen printing, transfer pad printing, or rotary pad printing so that the coating may be completed in a single application. The organoresin entrains a solid phase lubricant such as carbon monofluoride; boron nitride; a sulfide, selenide, or telluride of molybdenum, tungsten, or titanium; graphite; and fluorinated carbon compounds such as polytetrafluoroethylene. One such coating used with the present invention comprises about 5% to about 30% by volume graphite entrained in a cured polyamide-imide, and is applied as an uncured mixture suspended in N-methylpyrrolidone via a direct screen printing process. Such a coating may be purchased under the trade name Molykote D10 from Dow Corning Corporation of Midland, Mich. (USA). Another suitable coating would comprise about 2% to about 20% by volume molybdenum disulfide and about 0.5% to about 3.5% by volume graphite entrained in a cured polyamide-imide, and could be applied as an uncured mixture suspended in N-methylpyrrolidone and other solvents via processes such as dipping. Such a coating may be purchased under the trade name Molykote 7409 from Dow Corning Corporation. The mixtures are cured to produce the described coatings in accordance with the manufacturer's directions and/or conventional modifications thereof.

In a third step 240 of the disclosed method, the coated piston 100 is fitted into the cylinder of an internal combustion engine. The piston 100 may be inserted into the cylinder in a conventional manner, and in accordance with the method the coated piston may, except in the case of a cylinder at the larger end of an accepted tolerance, have a coated skirt diameter which is larger than the actual cylinder diameter. However, in contrast to an uncoated piston, during the insertion process interference between the wear coating 180 of the piston 100 and the opening of the cylinder will tend to first center the piston within the cylinder and then shear any excess wear coating 180 off of the piston skirt 140. The insertion process may thereby produce an interference fit between the piston 100 and the cylinder so that the piston 100 will not be undersized with respect to the cylinder. The assembly or repair of the engine may subsequently be completed prior to operation of the engine.

In a fourth step 260 of the disclosed method, the coated piston 100 is run within the cylinder of the internal combustion engine. In accordance with the method the coated piston may, except in the case of a cylinder at the larger end of an accepted tolerance, have an external diameter which does not provide the optimal piston-to-cylinder clearance, however the wear coating 180 of the piston 100 will tend to compensate for any oversizing of the coated piston by adapting with respect to the cylinder until normal oil dynamics become established. The entrained solid lubricants may act to prevent piston seizure, piston wear, and cylinder wear by direct contact with the cylinder walls until sufficient clearance develops to permit lubrication by oil or other lubricants.

Pistons manufactured according to steps 200 and 220 may be marked or packaged so as to reduce or even eliminate the need to inventory a well populated range of piston grades for the assembly and servicing of a particular model of engine. For example, as shown in FIG. 5, pistons 100 may be marked or packaged 300 so as to indicate an intended cylinder diameter which is simply the nominal diameter of cylinders in the predetermined model of engine, as opposed to a graded diameter of the cylinder. Such a marking could be used when the piston 100 is suitable for use within any of the graded cylinders established for the predetermined model of engine. Alternately, as shown in FIG. 5, pistons 100 may be marked or packaged 320 so as to indicate an intended cylinder diameter which includes multiple grade indications applicable to such cylinders. Such a marking could be used when the piston 100 is suitable for use within a subset of the graded cylinders established for the predetermined model of engine, and effective to reduce the population of separate piston grades inventoried for the assembly and servicing of the predetermined model of engine.

The applicants have advantageously found that by applying an unusually thick wear coat 180 to the skirt 140 of a piston 100, it is possible to fit a piston into the cylinder of an internal combustion engine, and to reduce or even eliminate the need to manufacture and inventory multiple piston sizes for particular models of engine in order to satisfy a particular piston-to-cylinder wall clearance tolerance. During testing of engines assembled with pistons having a 45 micron (0.045 mm or 0.0018 inches) thick wear coating, the applicants have observed a slight decrease in output power during initial engine operation, but a return to normal levels of output power after continued operation at normal temperatures for a period of about 20 to about 30 minutes. In addition, during durability testing of engines assembled with such pistons, the applicants have observed an initial loss of about 5 microns of wear coating thickness, but negligible additional losses after extended engine operation. Further details concerning these characteristics may be found in the particular examples provided below.

Example of Initial Fitting

Specifications for engine cylinder internal diameter, piston external diameter, and piston-to-cylinder wall clearance for a 125 cc two-stroke engine (used in Yamaha YZ125 motorcycles) are set forth in Table 1. Aftermarket pistons were prepared according to an embodiment of the above-described method by manufacturing pistons having an external diameter of 53.937 mm (2.1235 inch) and a tolerance for the external diameter of +0.000/−0.014 mm (+0.0000/−0.0005 inch). These pistons were subsequently coated with a wear coating of Molykote D10 by a direct screen printing process to yield a cured coating having a thickness of 30 microns, ±6 microns (0.03 mm or 0.0012 inch, ±0.006 mm or 0.0002 inches). A 100.9 thread-per-inch screen (80 micron thread diameter, 150 micron mesh opening) was used to obtain a coating having an average pre-cured thickness of 41 microns and an average cured thickness of 36 microns. Calculated minimum and maximum clearances from the surface of the piston skirt and the surface of the wear coating are set forth in Table 2. Negative coating-to-cylinder wall clearances indicate that assembly produced an interference fit, with excess coating typically shearing from the piston skirt during installation. It will be appreciated that a single piston part was provided in which the maximum clearance between the wear coating and the cylinder wall did not exceed the maximum clearance between piston and cylinder wall shown in Table 1, and in which the minimum clearance between the piston and the cylinder wall was not less than the minimum clearance between piston and cylinder wall shown in Table 1. Thus, the coated piston parts were neither undersized with respect to the engine cylinders nor oversized with respect to the engine cylinders, the wear coating providing a moderately abradable solid lubricant that would act to overcome the effects of any substantial oversizing of the coated diameter.

TABLE 1

Specifications for an exemplary 125 cc two-stroke engine

| Cylinder Grade | Cylinder Size (mm and inches) | Piston Size (mm and inches) | Piston-to-Cylinder Wall Clearance Minimum/Maximum |
|---|---|---|---|
| A | 54.000-54.002 mm (2.1260-2.1261") | 53.957-53.960 mm (2.1243-2.1244") | 0.040/0.045 mm 0.0016/0.0018 inches |
| B | 54.004-54.006 mm (2.1261-2.1262") | 53.961-53.964 mm (2.1244-2.1246") | 0.040/0.045 mm 0.0015/0.0018 inches |
| C | 54.008-54.010 mm (2.1263-2.1264") | 53.965-53.968 mm (2.1246-2.1247") | 0.040/0.045 mm 0.0016/0.0018 inches |
| D | 54.012-54.014 mm (2.1265-2.1265") | 53.969-53.972 mm (2.1248-2.1249") | 0.040/0.045 mm 0.0016/0.0017 inches |

TABLE 2

Clearances for coated pistons fitted into the exemplary 125 cc two-stroke engine

| Cylinder Grade | Coated Piston Size (mm and inches) | Bare Piston-to-Cylinder Wall Clearance Minimum/Maximum | Coating-to-Cylinder Wall Clearance Minimum/Maximum |
|---|---|---|---|
| A | 53.985-54.020 mm (2.1254-2.1268") | 0.051/0.065 mm 0.0020/0.0026 inches | −0.020/+0.017 mm −0.0008/+0.0007 inches |
| B | 53.985-54.020 mm (2.1254-2.1268") | 0.055/0.069 mm 0.0021/0.0027 inches | −0.017/+0.020 mm −0.0007/+0.0008 inches |
| C | 53.985-54.020 mm (2.1254-2.1268") | 0.059/0.073 mm 0.0023/0.0029 inches | −0.013/+0.024 mm −0.0005/+0.0010 inches |
| D | 53.985-54.020 mm (2.1254-2.1268") | 0.063/0.077 mm 0.0025/0.0030 inches | −0.007/+0.028 mm −0.0003/+0.0011 inches |

Example of Performance and Durability Characteristics

Aftermarket pistons were prepared according to an embodiment of the above-described method for use in a 124 CID, V-twin, four-stroke engine. The engine cylinder specifications required an internal diameter of 104.775 mm, ±0.008 mm (4.125 inches, ±0.0003 inch). The piston-to-cylinder wall clearance specifications required a piston-to-cylinder wall clearance of 0.076 mm, ±0.013 mm (0.0030 inch, ±0.0005 inch). Pistons were manufactured to have an external diameter of 104.699 mm, ±0.013 mm (4.1220 inches, ±0.0005 inch), and subsequently coated as described in the previous example with a cured coating having a thickness of about 30 microns (0.03 mm or 0.0012 inch). Consequently, coated pistons having an external diameter of 104.757 mm, ±0.025 mm (4.1243 inches, ±0.0010 inch) were produced. Two test pistons were selected and determined to have uncoated external diameters of 104.699 mm (4.1220 inches) and coated external diameters of 104.762 mm (4.1245 inches). The test pistons were fitted into a test engine with cylinders having an internal diameter of 104.775 mm (4.1250 inches), providing a coated piston-to-cylinder wall clearance of 0.013 mm (0.0005 inch) and a bare piston-to-cylinder wall clearance of 0.076 mm (0.0030 inch).

The test piston was operated in the test engine over a distance of about 4300 miles. Mechanical measurement of the post-break-in piston external diameter yielded a diameter of 104.694 mm (4.1218 inches) and indicated a post-break-in piston-to-cylinder wall clearance of 0.081 mm (0.0032 inches). Eddy current measurement of the post-break-in piston coating thickness over the piston skirt indicated a coating thickness of 38 microns (0.038 mm or 0.0015 inches) on the major thrust face and 13 microns (0.013 mm or 0.0005 inches) on the minor thrust face, with 0.033 mm (0.0013 inches) of the difference in overall piston diameter arising due to permanent mechanical deformation of the piston skirt during break-in operation. It is notable that in the tested engines, point on the minor thrust face at which the piston external diameter is measured is essentially located at the end of the piston skirt, and is subject to significant scuffing due to a notch provided in the skirt to accommodate the intersection of the long-bore V arrangement in the engine. Pre-break-in eddy current measurements of the coating thickness over the piston skirt indicated a coating thickness of 43 microns (0.043 mm or 0.0017 inches) over each of the major and minor thrust faces, suggesting that only minor wear had occurred on the major thrust face of the piston. Differences in the eddy current measurements and mechanical measurements of coating thickness over the piston skirt were primarily an artifact of conducting the eddy current measurement procedures on a coating laid over a curved surface.

Use of the above-described method will advantageously reduce the need to manufacture and inventory a well populated range of piston sizes for the assembly and servicing of a particular model of engine. For example, as shown in Tables 1 and 2 above, in a engine with a cylinder specification of 54 mm (2.1260 inch), +0.014/−0.000 mm (+0.0005/−0.000 inch), and piston-to-cylinder clearance specification of 0.040 mm (0.0016 inch), +0.005/−0.000 mm (+0.0002/−0.000 inch), an ungraded piston product could be manufactured and stocked having an uncoated external diameter of up to 53.960 mm (2.1244 inch) with a coated external diameter of about 54.020 mm (2.1268 inch) (assuming a coating thickness of about 30 microns) and be properly fitted into an engine cylinder having any actual internal diameter within the graded specifications, i.e. from 54.000 mm to at least 54.014. Furthermore, the ungraded piston product could have an uncoated external diameter of as little as 53.909 mm (2.1224 inch) and be properly fitted into an engine cylinder having any actual internal diameter within the graded specifications, allowing for manufacturing tolerances substantially greater than the tolerances generally described above. Consequently, existing equipment may be combined with the method in order to manufacture only a single piston product for a single model of engine, and a distributor may inventory only that single piston product for customers having that single model of engine, so as to reduce administrative and capital expenses, and lessen the probability of a shortage by reducing the specificity of the inventoried piston part.

Having described the invention in detail and by reference to the preferred embodiments, it will be apparent that modifications and variations thereof are possible without departing from the scope of this disclosure.

What is claimed is:

1. A piston assembly comprising:
   a piston body having a crown and a skirt, said skirt including at least a major thrust face and a minor thrust face, wherein said piston body defines a bore between said major thrust face and said minor thrust face; and
   a wear coating applied to said major thrust face and said minor thrust face;
   wherein at least one of said piston assembly and packaging therefor is marked to indicate that said piston assembly is intended for use in a corresponding cylinder, said corresponding cylinder having an actual diameter, and wherein a diameter of said skirt with said wear coating is greater than said actual diameter.

2. The piston assembly of claim 1 wherein said wear coating has a cured thickness of one of at least about 40 microns, at least about 45 microns, and at most about 50 microns.

3. The piston assembly of claim 1 wherein said wear coating is moderately abradable.

4. The piston assembly of claim 1 wherein said wear coating includes a curable organoresin.

5. The piston assembly of claim 4 wherein said curable organoresin is selected from the group consisting of polyamide, polyimide, polyamide-imide, polyetheretherketone, and combinations thereof.

6. The piston assembly of claim 1 wherein said wear coating includes a solid phase lubricant.

7. The piston assembly of claim 6 wherein said solid phase lubricant comprises about 5 to about 30 percent of said wear coating by volume.

8. The piston assembly of claim 6 wherein said solid phase lubricant is selected from the group consisting of carbon monofluoride; boron nitride; a sulfide, selenide or telluride of molybdenum, tungsten or titanium; graphite; polytetrafluoroethylene; and combinations thereof.

9. A piston assembly comprising:
   a piston body having a crown and a skirt, said skirt including at least a major thrust face and a minor thrust face, wherein said piston body defines a bore between said major thrust face and said minor thrust face; and
   a wear coating applied to said major thrust face and said minor thrust face, said wear coating having a cured thickness of at least about 30 microns;
   wherein said piston assembly is marked to indicate that said piston assembly is intended for use in a corresponding cylinder, said corresponding cylinder having an actual diameter, and wherein a diameter of said skirt with said wear coating is greater than said actual diameter.

10. A piston assembly comprising:
    a piston body having a crown and a skirt, said skirt including at least a major thrust face and a minor thrust face, wherein said piston body defines a bore between said major thrust face and said minor thrust face; and a wear coating applied to said major thrust face and said minor thrust face, said wear coating having a cured thickness of at least about 30 microns;

wherein said piston assembly is received in a package that indicates that said piston assembly is intended for use in a corresponding cylinder, said corresponding cylinder having an actual diameter, and wherein a diameter of said skirt with said wear coating is greater than said actual diameter.

11. A method for fitting a piston having a skirt into a corresponding cylinder having a cylinder diameter, said method comprising the steps of:

applying a wear coating to at least a portion of said skirt;

curing said wear coating, wherein a diameter of said coated skirt is greater than said cylinder diameter; and after said curing step, fitting said piston into said corresponding cylinder to shear at least a portion of said cured wear coating from said skirt; and marking at least one of said piston and packaging associated therewith to identify at least one of said corresponding cylinder and said cylinder diameter.

12. The method of claim 11 further comprising the step of, after said fitting step, reciprocating said piston in said corresponding cylinder.

13. The method of claim 11 wherein said wear coating includes a curable organoresin.

14. The method of claim 13 wherein said curable organoresin is selected from the group consisting of polyamide, polyimide, polyamide-imide, polyetheretherketone, and combinations thereof.

15. The method of claim 11 wherein said wear coating includes a solid phase lubricant.

16. The method of claim 15 wherein said solid phase lubricant is selected from the group consisting of carbon monofluoride; boron nitride; a sulfide, selenide or telluride of molybdenum, tungsten or titanium; graphite; polytetrafluoroethylene; and combinations thereof.

17. A method for fitting a piston having a skirt into a corresponding cylinder having a cylinder diameter, said method comprising the steps of:

applying a wear coating to at least a portion of said skirt;

curing said wear coating, said cured wear coating having a thickness of at least about 30 microns, wherein a diameter of said coated skirt is greater than said cylinder diameter; and after said curing step, fitting said piston into said corresponding cylinder to shear at least a portion of said cured wear coating from said skirt; and marking at least one of said piston and packaging associated therewith to identify at least one of said corresponding cylinder and said cylinder diameter.

18. A method for fitting a piston into a cylinder, the method comprising:

applying a wear coating to at least a portion of a skirt of the piston;

curing the wear coating;

selecting a cylinder having an actual diameter less than an actual diameter of the portion of the skirt having the wear coating; and fitting the piston into the selected cylinder, thereby shearing excess wear coating off of the a portion of the skirt to ensure that a maximum piston-to-cylinder wall clearance, including the wear coating, is not exceeded.

19. The method of claim 18 wherein selecting a cylinder includes selecting a cylinder having a predetermined minimum internal diameter.

* * * * *